(12) United States Patent
Robertson et al.

(10) Patent No.: US 7,614,686 B2
(45) Date of Patent: Nov. 10, 2009

(54) STRUCTURAL REINFORCEMENT SYSTEM FOR AN AUTOMOTIVE VEHICLE

(75) Inventors: James E. Robertson, Rochester, MI (US); Robert G. Storc, Rochester Hills, MI (US); Mostafa Rashidy, West Bloomfield, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 8 days.

(21) Appl. No.: 11/899,141

(22) Filed: Sep. 4, 2007

(65) Prior Publication Data
US 2009/0021050 A1 Jan. 22, 2009

Related U.S. Application Data

(63) Continuation of application No. 10/822,901, filed on Apr. 13, 2004, now abandoned.

(60) Provisional application No. 60/499,669, filed on Sep. 3, 2003.

(51) Int. Cl.
B60J 7/00 (2006.01)
(52) U.S. Cl. .............................. 296/193.02; 296/187.12
(58) Field of Classification Search ............ 296/193.02, 296/187.03, 187.05, 187.12
See application file for complete search history.

(56) References Cited

U.S. PATENT DOCUMENTS

| 1,463,193 A | 7/1923 | Botella |
|---|---|---|
| 1,694,546 A | 12/1928 | Lancia |
| 1,794,465 A | 3/1931 | Ledwinka |
| 1,797,989 A | 3/1931 | Ledwinka |
| 2,079,232 A | 5/1937 | Smith |
| 2,370,211 A | 2/1945 | Ulrich |
| 2,597,837 A | 5/1952 | Lindsay |
| 2,751,247 A | 6/1956 | Barenyi |
| 3,021,172 A | 2/1962 | Fiala et al. |
| 3,328,935 A | 7/1967 | Peras |
| 3,944,276 A | 3/1976 | De Rosa et al. |
| 4,230,361 A | 10/1980 | Nachbur et al. |
| 4,231,607 A | 11/1980 | Bohlin |
| 4,346,930 A | 8/1982 | Northey |
| 4,493,506 A | 1/1985 | Alexander |
| 4,514,891 A | 5/1985 | Draper |

(Continued)

FOREIGN PATENT DOCUMENTS

AU 655 926 B 1/1996

(Continued)

OTHER PUBLICATIONS

European Search Report dated Nov. 15, 2007, 7 pages.

(Continued)

*Primary Examiner*—Joseph D Pape
(74) *Attorney, Agent, or Firm*—Harness, Dickey & Pierce, P.L.C.

(57) ABSTRACT

A structural reinforcement system is provided for an automotive vehicle. In another aspect of the present invention, an upper structural beam is employed which extends in a cross-vehicle direction adjacent to a vehicle belt-line. A further aspect of the present invention employs an upper structural beam with a recessed central portion. Yet another aspect of the present invention uses a structural reinforcement system in a convertible roof vehicle.

63 Claims, 15 Drawing Sheets

U.S. PATENT DOCUMENTS

| | | |
|---|---|---|
| 4,570,321 A | 2/1986 | Draper |
| 4,613,184 A | 9/1986 | Rispeter et al. |
| 4,660,345 A | 4/1987 | Browning |
| 4,662,052 A | 5/1987 | Draper |
| 4,729,156 A | 3/1988 | Norris, Jr. et al. |
| 4,892,350 A | 1/1990 | Kijima |
| 4,940,282 A | 7/1990 | Townsend |
| 4,944,553 A | 7/1990 | Medley et al. |
| 4,950,026 A | 8/1990 | Emmons |
| 4,968,087 A | 11/1990 | Goria |
| 5,018,780 A | 5/1991 | Yoshii et al. |
| 5,020,846 A | 6/1991 | Bonnett |
| 5,094,478 A | 3/1992 | Pfanzeder et al. |
| 5,110,176 A | 5/1992 | Curtis |
| 5,194,199 A | 3/1993 | Thum |
| 5,238,286 A | 8/1993 | Tanaka et al. |
| 5,255,487 A | 10/1993 | Wieting et al. |
| 5,351,400 A | 10/1994 | Samuel |
| 5,435,618 A | 7/1995 | Sacco et al. |
| 5,575,531 A | 11/1996 | Gauger et al. |
| 5,577,797 A | 11/1996 | Takanishi |
| 5,584,525 A | 12/1996 | Nakano et al. |
| 5,641,193 A | 6/1997 | Zepnik et al. |
| 5,641,194 A | 6/1997 | Honma et al. |
| 5,772,274 A | 6/1998 | Tokarz |
| 5,788,322 A | 8/1998 | Wolf et al. |
| 5,803,533 A | 9/1998 | Schulz et al. |
| 5,806,918 A | 9/1998 | Kanazawa |
| 5,868,426 A | 2/1999 | Edwards et al. |
| 5,881,458 A | 3/1999 | Wolf et al. |
| 5,921,618 A | 7/1999 | Mori et al. |
| 5,954,390 A | 9/1999 | Kleinhoffer et al. |
| 5,988,734 A | 11/1999 | Longo et al. |
| 5,997,078 A | 12/1999 | Beck et al. |
| 6,007,145 A | 12/1999 | Tezuka |
| 6,039,386 A | 3/2000 | Hasshi et al. |
| 6,053,567 A | 4/2000 | Ito |
| 6,126,232 A | 10/2000 | Nakano |
| 6,139,082 A | 10/2000 | Davis, Jr. et al. |
| 6,168,228 B1 | 1/2001 | Heinz et al. |
| 6,176,544 B1 | 1/2001 | Seksaria et al. |
| 6,189,952 B1 | 2/2001 | Schmidt et al. |
| 6,193,306 B1 | 2/2001 | Lee |
| 6,220,654 B1 | 4/2001 | Sommer |
| 6,237,991 B1 | 5/2001 | Weber |
| 6,270,153 B1 | 8/2001 | Toyao et al. |
| 6,273,498 B1 | 8/2001 | Hillman et al. |
| 6,296,301 B1 | 10/2001 | Schroeder et al. |
| 6,299,238 B1 | 10/2001 | Takagi et al. |
| 6,299,239 B1 | 10/2001 | Sagawa et al. |
| 6,299,240 B1 | 10/2001 | Schroeder et al. |
| 6,315,353 B1 | 11/2001 | Brodt et al. |
| 6,332,643 B1 | 12/2001 | Sukegawa et al. |
| 6,382,710 B1 | 5/2002 | Funk et al. |
| 6,398,292 B2 | 6/2002 | Tsuruta et al. |
| 6,434,907 B1 | 8/2002 | Simboli |
| 6,443,517 B1 | 9/2002 | Just et al. |
| 6,443,518 B1 | 9/2002 | Rohl et al. |
| 6,491,337 B2 | 12/2002 | Averdiek et al. |
| 6,568,745 B2 | 5/2003 | Kosuge et al. |
| 6,572,181 B2 | 6/2003 | Jonsson |
| 6,578,903 B2 | 6/2003 | Ernst et al. |
| 6,644,725 B2 | 11/2003 | Braitmaier et al. |
| 6,655,729 B2 | 12/2003 | Neale |
| 6,679,546 B2 | 1/2004 | Mishima et al. |
| 6,688,677 B2 | 2/2004 | Glashagel et al. |
| 2001/0019216 A1 | 9/2001 | Kobayashi |
| 2001/0045759 A1 | 11/2001 | Russke |
| 2002/0057004 A1 | 5/2002 | Corcoran et al. |
| 2002/0145307 A1 | 10/2002 | Fujita |
| 2002/0153749 A1 | 10/2002 | Lee |
| 2002/0195840 A1 | 12/2002 | Mishima et al. |
| 2003/0034671 A1 | 2/2003 | Streiff et al. |
| 2003/0038498 A1 | 2/2003 | Rajasingham |
| 2003/0057728 A1 | 3/2003 | Sims |
| 2003/0076964 A1* | 4/2003 | Stickles et al. ................ 381/86 |
| 2005/0067451 A1 | 3/2005 | Hussaini et al. |

FOREIGN PATENT DOCUMENTS

| | | |
|---|---|---|
| CA | 2 403 319 | 3/2003 |
| DE | 196 03 098 A1 | 7/1997 |
| DE | 199 16 849 | 10/2000 |
| EP | 0 059 147 | 5/1985 |
| EP | 0 934 865 | 8/1999 |
| EP | 1 151 882 | 11/2001 |
| FR | 459931 | 11/1913 |
| FR | 671743 | 12/1929 |
| FR | 2 120 326 A | 8/1972 |
| FR | 2 698 600 | 6/1994 |
| GB | 273894 | 7/1927 |
| GB | 612015 | 11/1948 |
| JP | 6-99851 | 4/1994 |
| JP | 11-115662 | 4/1999 |
| JP | 11-129368 | 5/1999 |
| WO | WO 02/096675 | 12/2002 |
| WO | WO 03/031746 | 4/2003 |

OTHER PUBLICATIONS

Mark Vaughn, "Chrysler 300C Cabriolet", (Newport Convertible Engineering, Inc.), Nov. 22, 2004, AutoWeek, p. 4.
"Drop-top-Rolls", Nov. 22, 2004, AutoWeek, p. 4.
European Search Report dated Aug. 2, 2005.
Photographs of 1942 Rolls-Royce, "Duchess" Fleetwood sedan with stationary roof (believed to have been offered for sale or publically used in 1942).
Photographs of 1931 Series 355 7-passenger touring vehicle with convertible roof and four doors (believed to have been offered for sale or publically used in 1931).
Photographs of 1941 Series Cadillac sixty-two convertible roof sedan (believed to have been offered for sale or publically used in 1941).
Photos and description of Kennedy Presidential Limousine (publicly used in 1960s).
Two photographs of 2005 Ford 500.
Photograph of Rolls Royce (publicly used or published in 1956).
Photographs of Lincoln Continental Limousine (publicly used or published prior to 2003).
G. Guzzardi and E. Rizzo, Convertibles—History and Evolution of Dream Cars (1998), 38 pages.
Photographs of metal structure for 2005 model year Ford 500 (2 pages).
Byron Bloch, Advanced Designs for Side Impact and Rollover Protection, 1998, 15 pages.

* cited by examiner

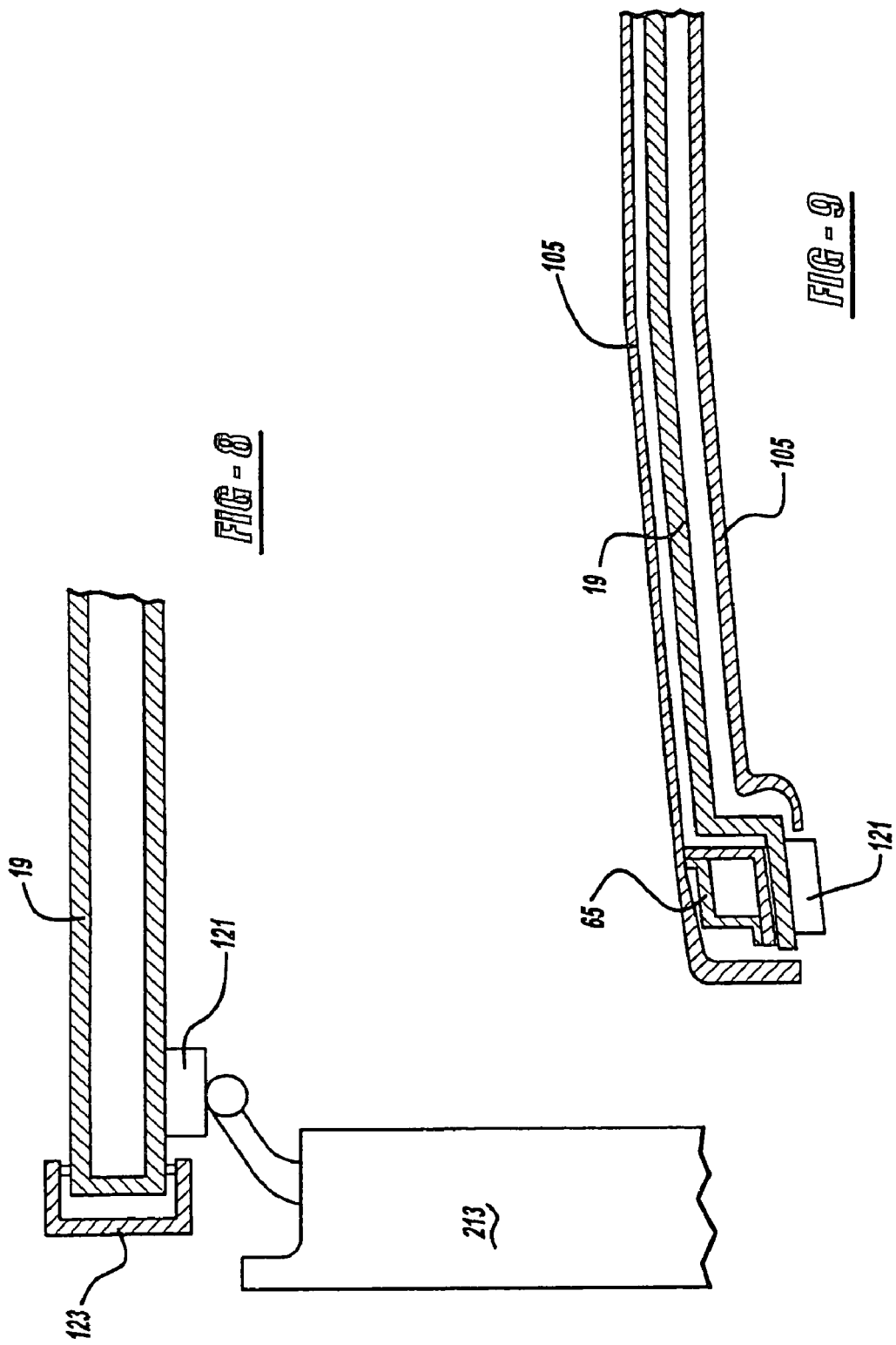

STRUCTURAL REINFORCEMENT SYSTEM FOR AN AUTOMOTIVE VEHICLE

CROSS-REFERENCE TO RELATED APPLICATIONS

This application is a continuation of U.S. patent application Ser. No. 10/822,901, filed Apr. 13, 2004 which claims the benefit of U.S. Provisional Application No. 60/499,669, filed on Sep. 3, 2003. The disclosure of the above application is incorporated by reference herein.

BACKGROUND AND SUMMARY OF THE INVENTION

The present invention generally relates to automotive vehicle structure and more particularly to a cross-vehicle structural reinforcement for an automotive vehicle.

Cross-vehicle body stiffness within automotive vehicles is important in reducing torsional twist and vibration of the body, but also improves the ride and handling of the vehicle. This issue is especially important for convertible vehicles where the removal of the traditional fixed roof structure further decreases vehicle stiffness to the point where four door convertible roof vehicles have been essentially impractical to achieve with conventional body structure. Furthermore, U.S. Federal Motor Vehicle Safety Standard ("FMVSS") 214 relates to side impact collision protection for vehicles. This governmental standard employs a moving barrier, equivalent to a truck bumper, which impacts the vehicle generally at and below a belt-line of the front door and B-pillar. FMVSS 214 puts an added premium on cross-vehicle stiffness.

U.S. Pat. No. 1,694,546 entitled "Motor Car," which issued to Lancia on Dec. 11, 1928, and U.S. Pat. No. 5,788,322 entitled "Body Structure for a Rear Carriage of a Convertible," which issued to Wolf et al. on Aug. 4, 1998, have both attempted to provide some cross-vehicle structure. It is noteworthy, however, that both constructions are attached to a fixed seat back and/or passenger compartment panel. Furthermore, the Lancia construction appears to lack any cross-vehicle structural support anywhere near the belt-line that would significantly resist side impacts or belt-line torsion, especially for a modern unibody construction vehicle.

In accordance with the present invention, a structural reinforcement system is provided for an automotive vehicle. In another aspect of the present invention, an upper structural beam is employed which extends in a cross-vehicle direction adjacent to a vehicle belt-line. A further aspect of the present invention provides an upper structural beam with a recessed central portion. Yet another aspect of the present invention uses a structural reinforcement system in a convertible roof vehicle.

The present invention is advantageous over conventional constructions, in that the present invention significantly improves cross-vehicle resistance to side impact collisions and provides torsional stiffness sufficient for use with a large four door vehicle, such as one having a convertible roof. The present invention further acts as a seat frame attachment thereby reducing parts and saving redundant weight as a multifunctional device. Moreover, the same structure that adds stiffness also retains rear passenger devices such as airbags, entertainment systems and the like. Additional features and advantages of the present invention will be shown and described with reference to the following description and appended figures.

BRIEF DESCRIPTION OF THE DRAWINGS

FIG. 8 is a diagrammatic, partially cross-sectional view, taken along line 8-8 of FIG. 4, showing the second preferred embodiment structural reinforcement system;

FIG. 9 is a diagrammatic, cross-sectional view, taken along line 8-8 of FIG. 4, showing the first preferred embodiment structural reinforcement system;

DETAILED DESCRIPTION OF THE PREFERRED EMBODIMENTS

Figure 1:
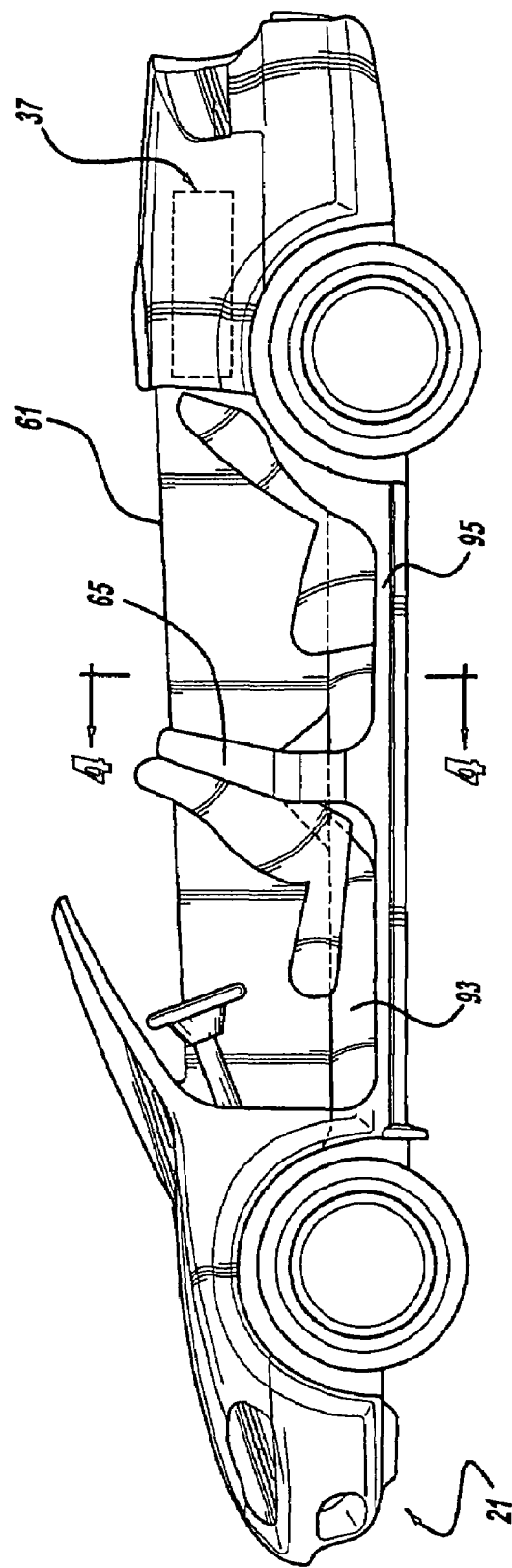
FIG. 1 is a side elevational view showing a first preferred embodiment automotive vehicle employing a structural reinforcement system of the present invention, with a hard-top convertible roof in a retracted position and with the left side doors removed.
Figure 2:
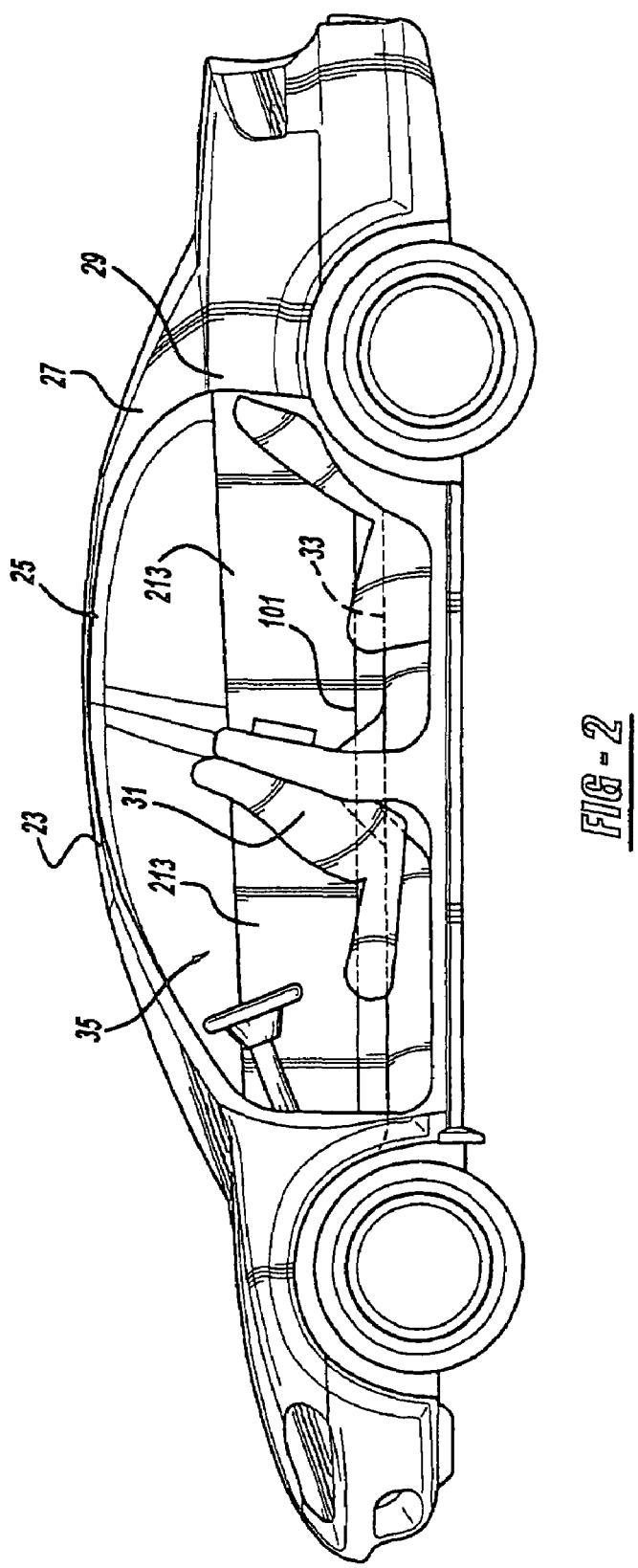
FIG. 2 is a side elevational view showing the first preferred embodiment automotive vehicle employing one structural reinforcement system, with the hard-top convertible roof in a raised position and with the left side doors removed.

An automotive vehicle according to the present invention has a body, a convertible roof and a structural reinforcement system 19. In a first preferred embodiment of vehicle 21, shown in FIGS. 1 and 2, the convertible roof is a retractable hard-top roof including a front hard-top section 23, a middle hard-top section 25 and a rear hard-top section 27. The hard-top sections are interconnected by a linkage assembly (not shown) driven by an automatic actuator 29, such as an electric motor or hydraulic cylinder. The convertible roof is movable from a raised and closed position above front passenger seats 31 and rear passenger seats 33 in a passenger compartment 35, as shown in FIG. 2, to a retracted and open position within a roof storage compartment 37, as shown in FIG. 1. Roof storage compartment 32 is a trunk with a dual opening decklid, or a bootwall, forward and separated from a trunk, covered by an automatically openable tonneau cover. Such a hard-top roof and linkage assembly is disclosed in U.S. patent Ser. No. 10/245,973, now U.S. Pat. No. 6,695,386, entitled "Vehicle Retractable Hardtop Roof," which was invented by Michael T. Willard and filed on Sep. 18, 2002, which is incorporated by reference herein.

Figure 3:
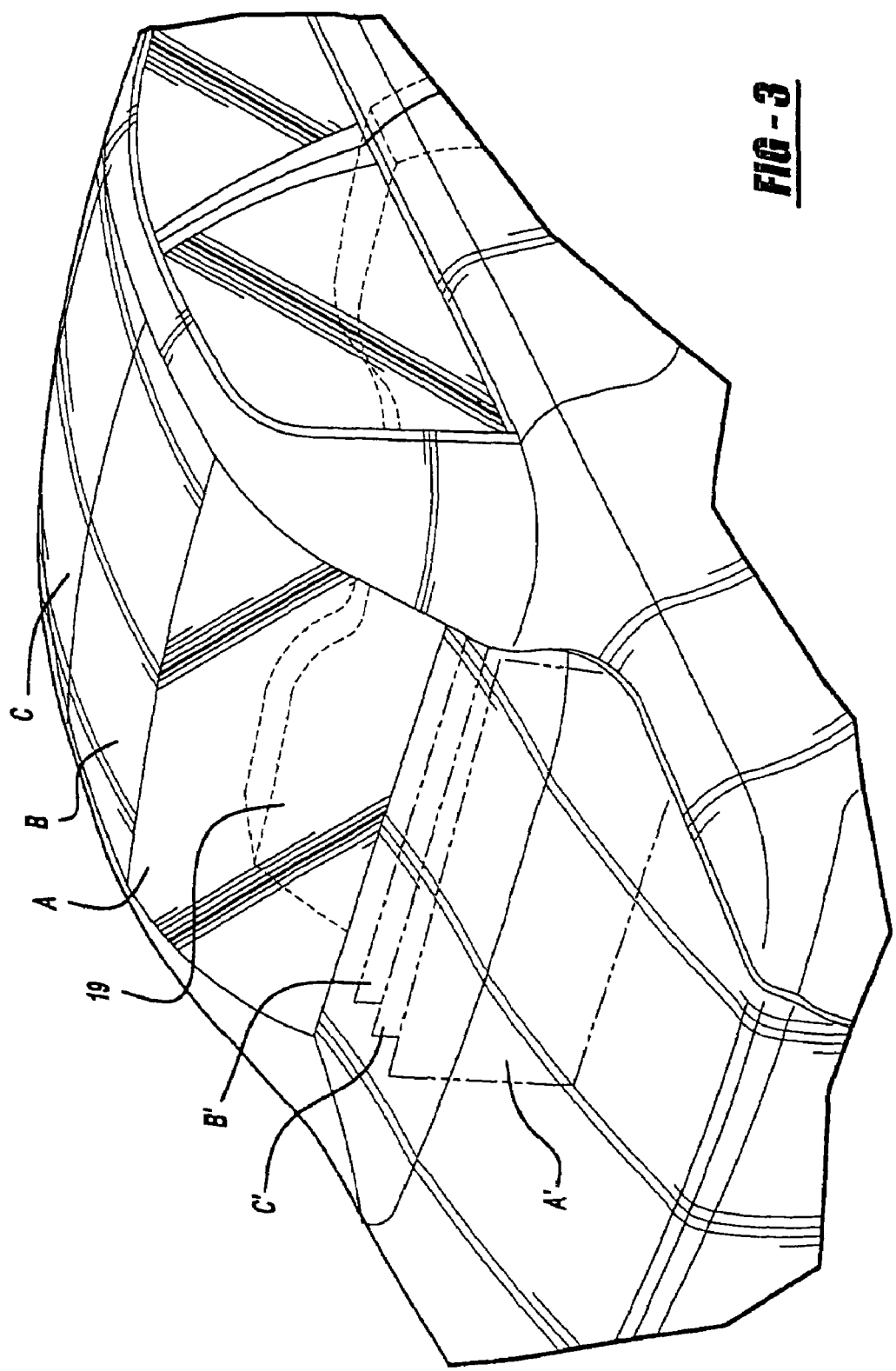
FIG. 3 is a perspective view as seen from behind the right rear corner, showing an alternate embodiment automotive vehicle employing a structure reinforcement system of the present invention, with a slidably retracting roof in a raised position.
Figure 18:
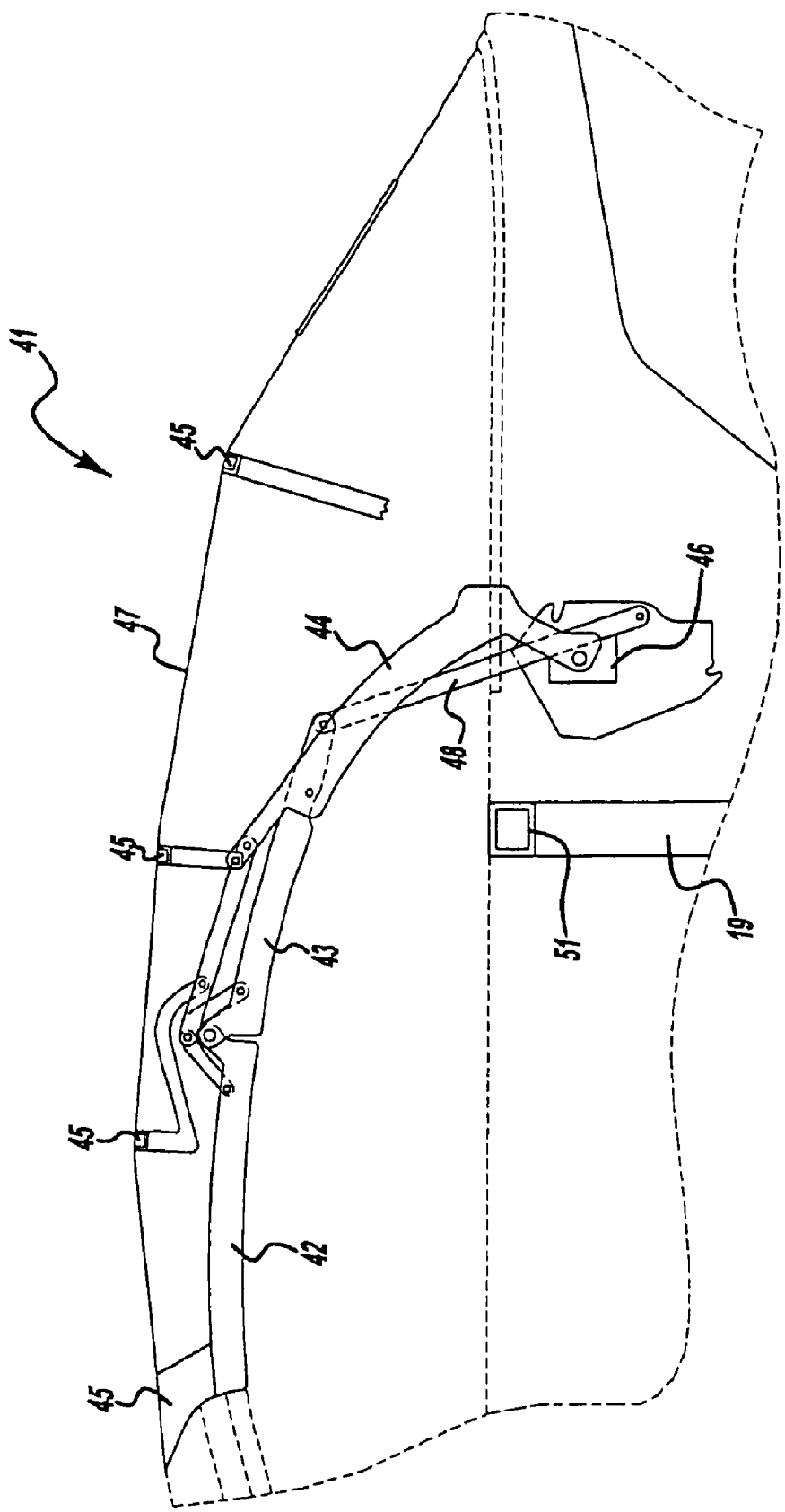
FIG. 18 is a diagrammatic, perspective view showing the first preferred embodiment system of the present invention but with a soft top convertible roof.

Referring to FIG. 18, a soft top convertible roof 41 is also usable with the present invention, and is disclosed in U.S. patent Ser. No. 10/403,362, now U.S. Pat. No. 6,695,385, entitled "Vehicle Convertible Roof," which was invented by Eric W. Lange and filed on Mar. 31, 2003; this disclosure is incorporated by reference herein. Soft top roof 41 includes a top stack mechanism including left and right, front, center and rear side rails, 42, 43 and 44, respectively, with four spanning roof bows 45 and multiple linkages 48. An electric motor or hydraulic actuator 46 automatically drives the mechanism and a pliable roof cover 47 is attached to and covers roof bows 45. Furthermore, FIG. 3 shows multiple sliding roof panels and a slidably retracting backlite or back window, which are employed with the present invention in a first alternate embodiment. This is disclosed in PCT Publication No. WO 02/096685 entitled "Automotive Vehicle with Open Air System" which was invented by Doncov et al. and published on Dec. 5, 2002; this disclosure is also incorporated by reference herein.

Figure 4:
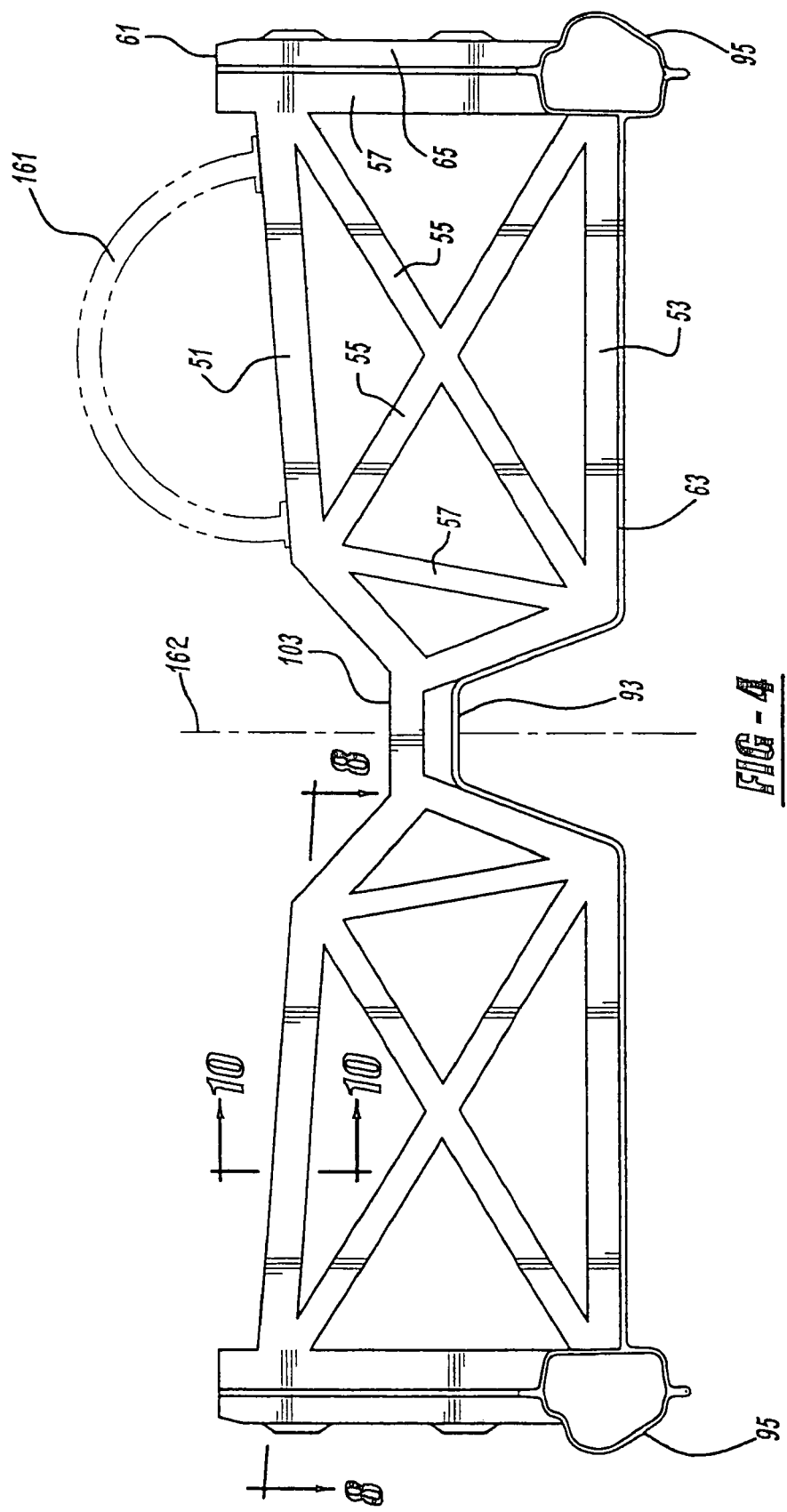
FIG. 4 is a partially fragmentary, rear diagrammatic view, as seen from line 4-4 of FIG. 1, showing a first preferred embodiment structural reinforcement system of the present invention.
Figure 5:
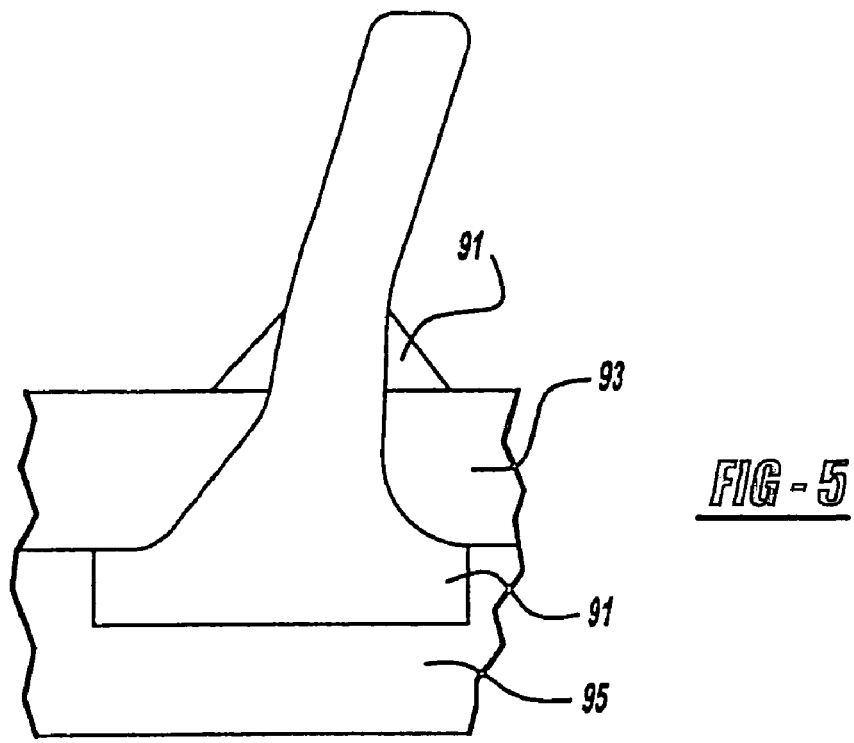
FIG. 5 is a diagrammatic side view showing the first preferred embodiment structural reinforcement system made by a stamping.
Figure 6:
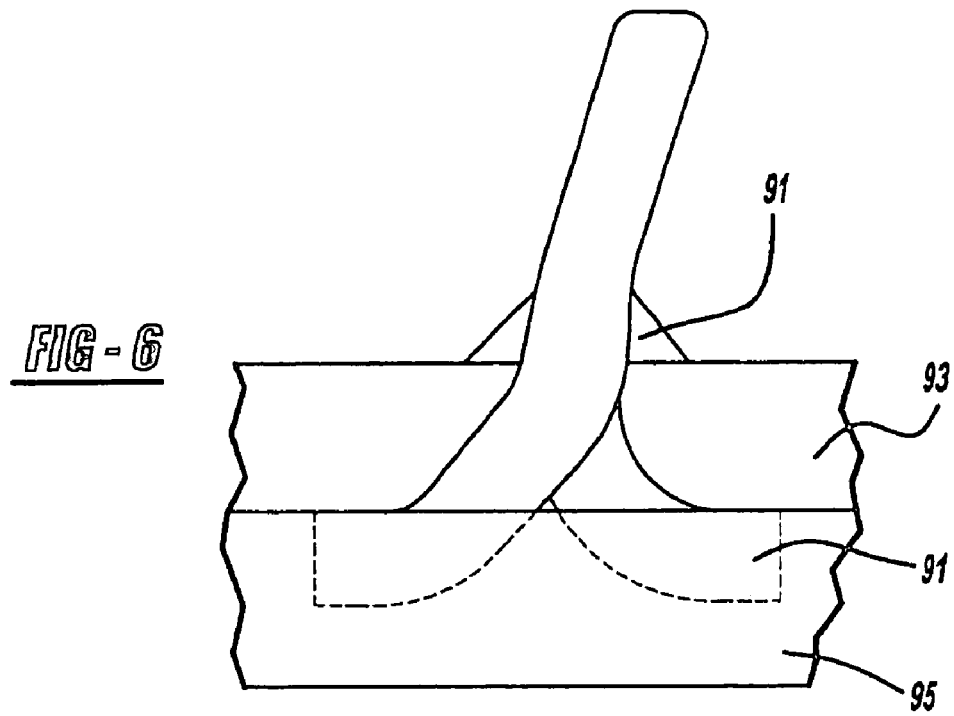
FIG. 6 is a diagrammatic side view showing the second preferred embodiment structural reinforcement system made by a hydroforming.
Figure 11:
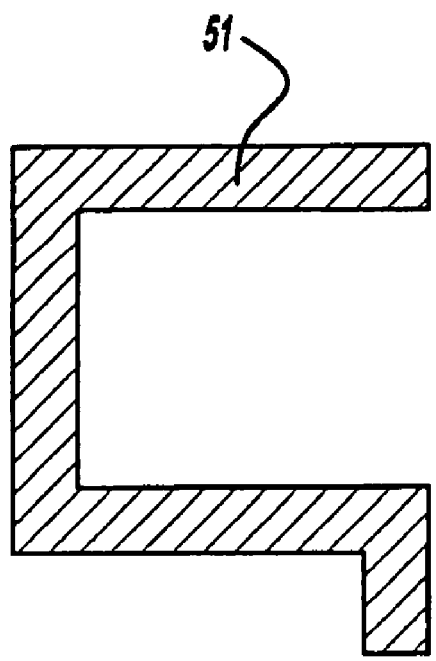
FIG. 11 is a cross-sectional view taken along line 10-10 of FIG. 4, showing the first preferred embodiment structural reinforcement system.
Figure 12:
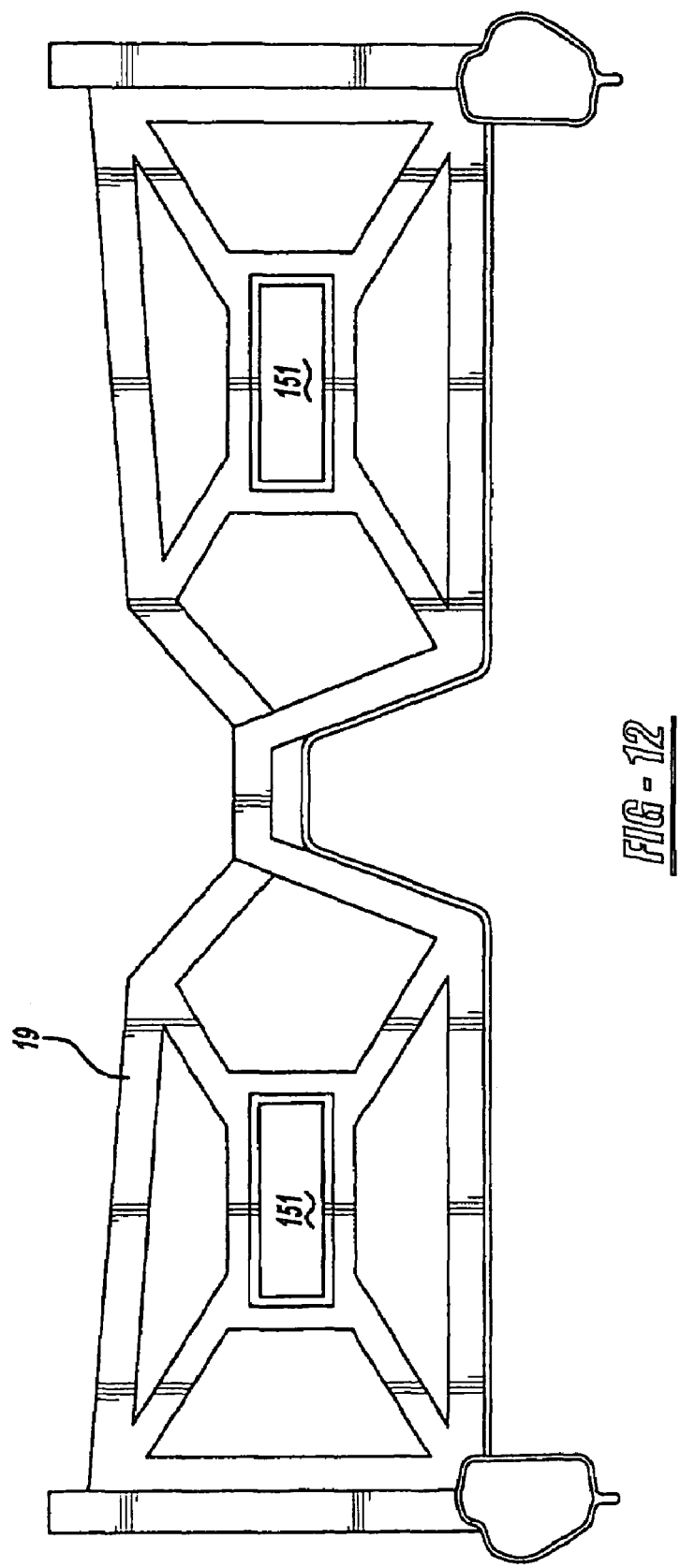
FIG. 12 is a diagrammatic rear view, as seen from line 4-4 of FIG. 1, showing a third preferred embodiment structural reinforcement system of the present invention.

Returning to the preferred embodiment of FIGS. 4-6, structural reinforcement system 19 is made up of multiple cross-vehicle upper and lower beams 51 and 53, respectively, and interconnected diagonal and vertical beams 55 and 57, respectively. Upper beam 51 is positioned adjacent a beltline 61 of the vehicle and lower beam 53 is attached to a sheet metal floor pan 63 of the vehicle The outboard vertical beams 57 are welded, riveted or otherwise secured to B-pillars 65 of the vehicle. Beams are preferably integrally hydroformed as a single steel piece, as shown in FIGS. 4, 6, 8, 10, 12, 13 and 15. In another preferred embodiment, beams are integrally stamped from sheet metal as a single piece, as shown in FIGS. 5, 9 and 11. Gussets 91 are attached to a center tunnel 93 of vehicle and to outboard rocker panels 95 of the unibody vehicle. Alternately, separated created beams can be welded together.

Figure 7:
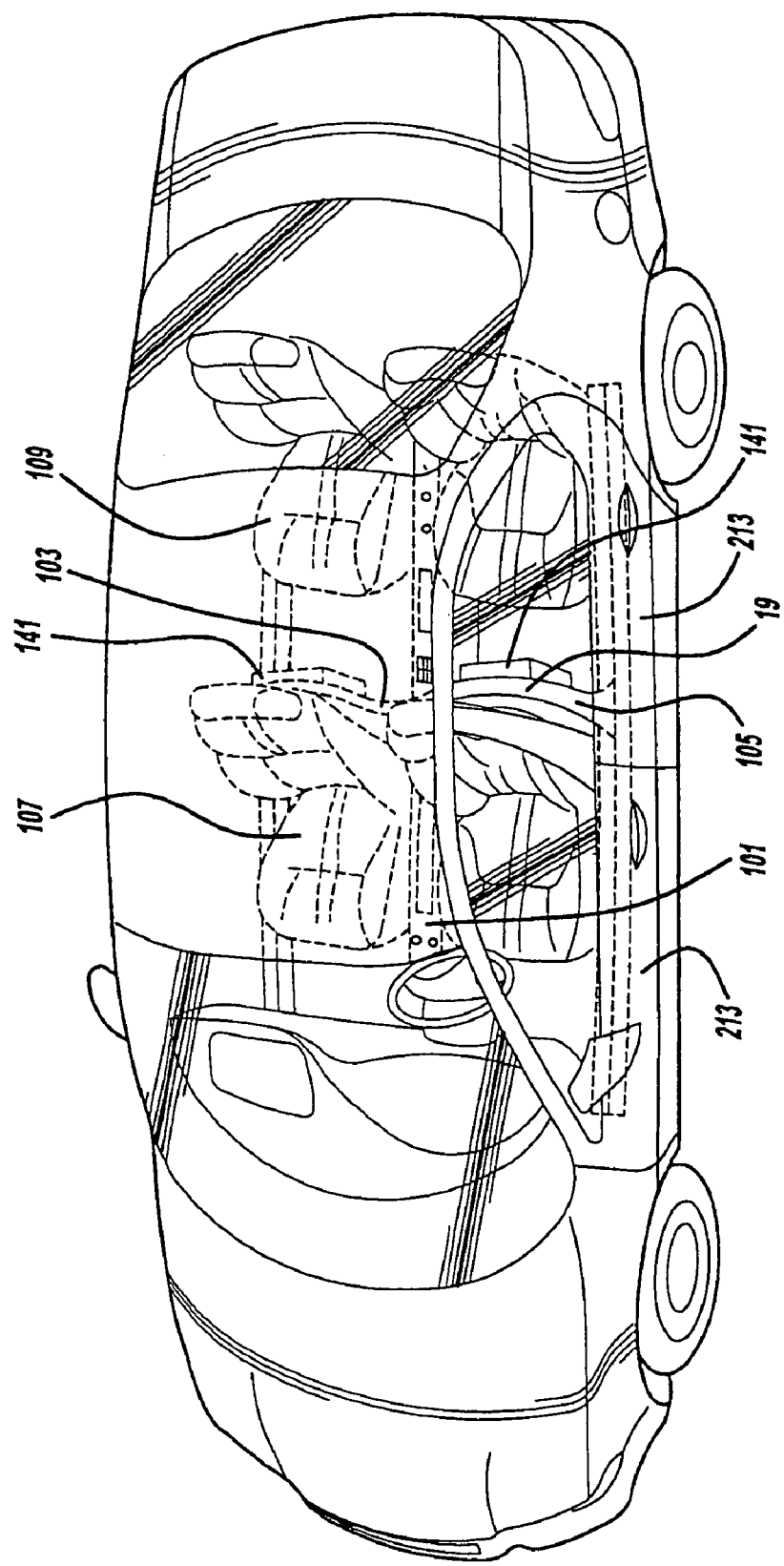
FIG. 7 is a perspective view showing a fragmentary third preferred embodiment automotive vehicle employing a structural reinforcement system of the present invention.
Figure 10:
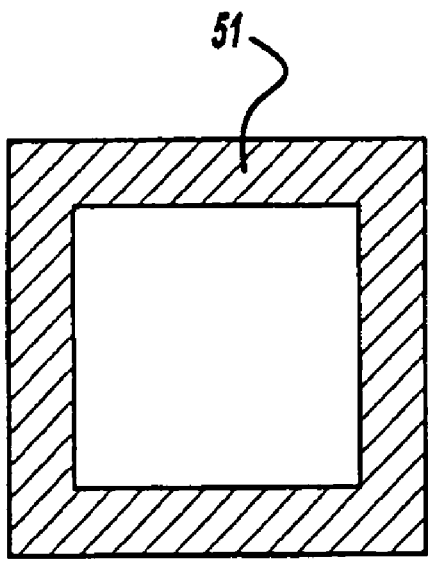
FIG. 10 is a cross-sectional view taken along line 10-10 of FIG. 4, showing the second preferred embodiment structural reinforcement system.

Reference should be made to FIGS. 7 and 8 where a polymeric center, floor trim console 101 extends from a front passenger area 107, through a recess 103 in upper beam 51 and into a rear seating area 109, between bucket front seats and bucket rear seats. Polymeric trim panels 105 also cover the exterior of structural system 19. Door hinge hardware 121 can be secured directly to reinforcement system 19 by bolts, rivets or welding. A decorative B-pillar facia 123 is attached to structural system 19 in an alternate embodiment. An electronic entertainment system 141, such as including an audio or video compact disc player, movie player, radio or the like, is located in a central pocket of each side of structural system 19 for use by the rear seat passengers. Furthermore, an inflatable air bag system 151 (see FIG. 12) may be provided in each pocket of structural system 19, the beams of which are angled to properly channel the deployment forces into the floor and B-pillars. Moreover, roll bars 161 (see FIG. 4) are optionally secured to upper beam 51 on each side of the vehicle's fore-and-aft centerline 163.

Figure 13:
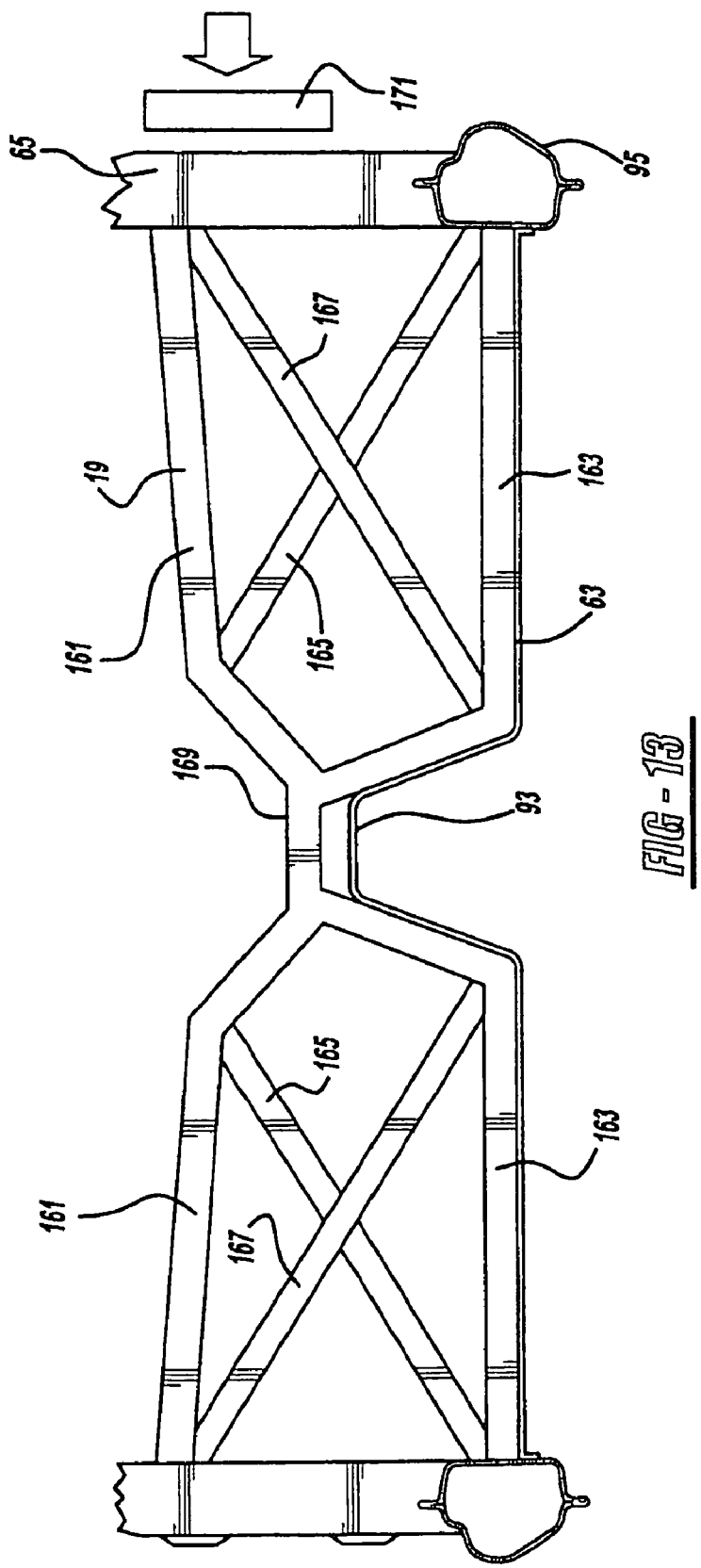
FIG. 13 is a diagrammatic rear view, as seen from line 4-4 of FIG. 1, showing a fourth preferred embodiment structural reinforcement system of the present invention.

FIG. 13 illustrates a fourth preferred embodiment structural reinforcement system 19 of the present invention. This exemplary structural reinforcement system 19 includes an upper beam 161, a lower beam 163, and pairs of crossing diagonal beams 165 and 167 spanning between the upper and lower beams outboard of a middle, recess 169 where upper and lower beams 161 and 163 converge. Ends of upper and lower beams 161 and 163 are directly affixed to adjacent and generally vertical B-pillars 65 and rocker panels 95, without supplemental vertical beams. A simulated bumper 171, according to FMVSS 214, is shown adjacent to the vehicle beltline which is generally aligned with the intersection between upper beam 161 and B-pillar 65.

Figure 14:
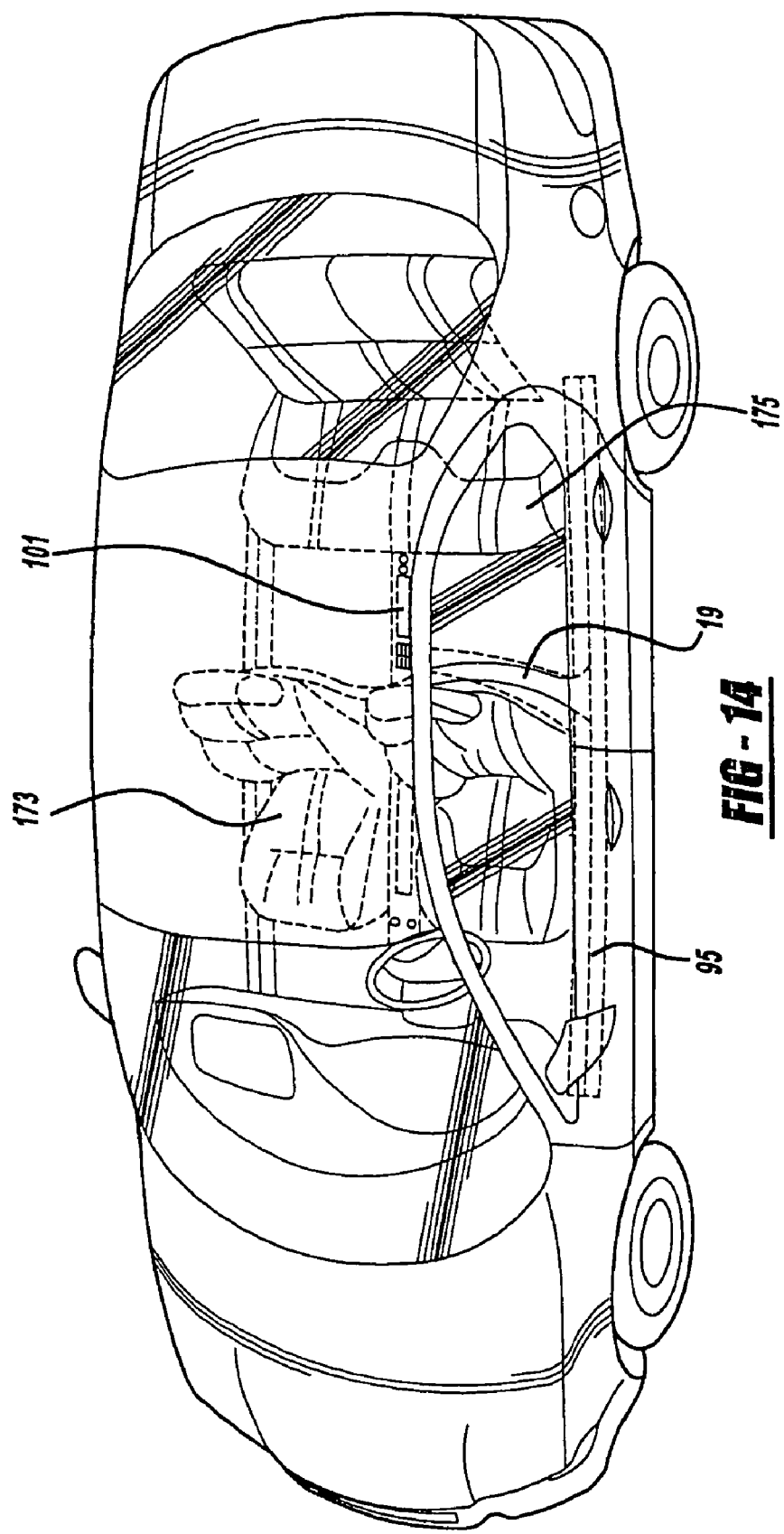
FIG. 14 is a perspective view showing the fourth preferred embodiment structural reinforcement system of the present invention.

FIG. 14 shows structural reinforcement system 19 with a floor-mounted, trim console 101 centrally extending in a fore-and-aft centerline direction of the vehicle. In this variation, console 101 extends between bucket front seats 173 and either is interrupted by, passes above or passes below beam recess 169. The rear end of console 101 terminates forward of a bench rear seat 175.

Figure 15:
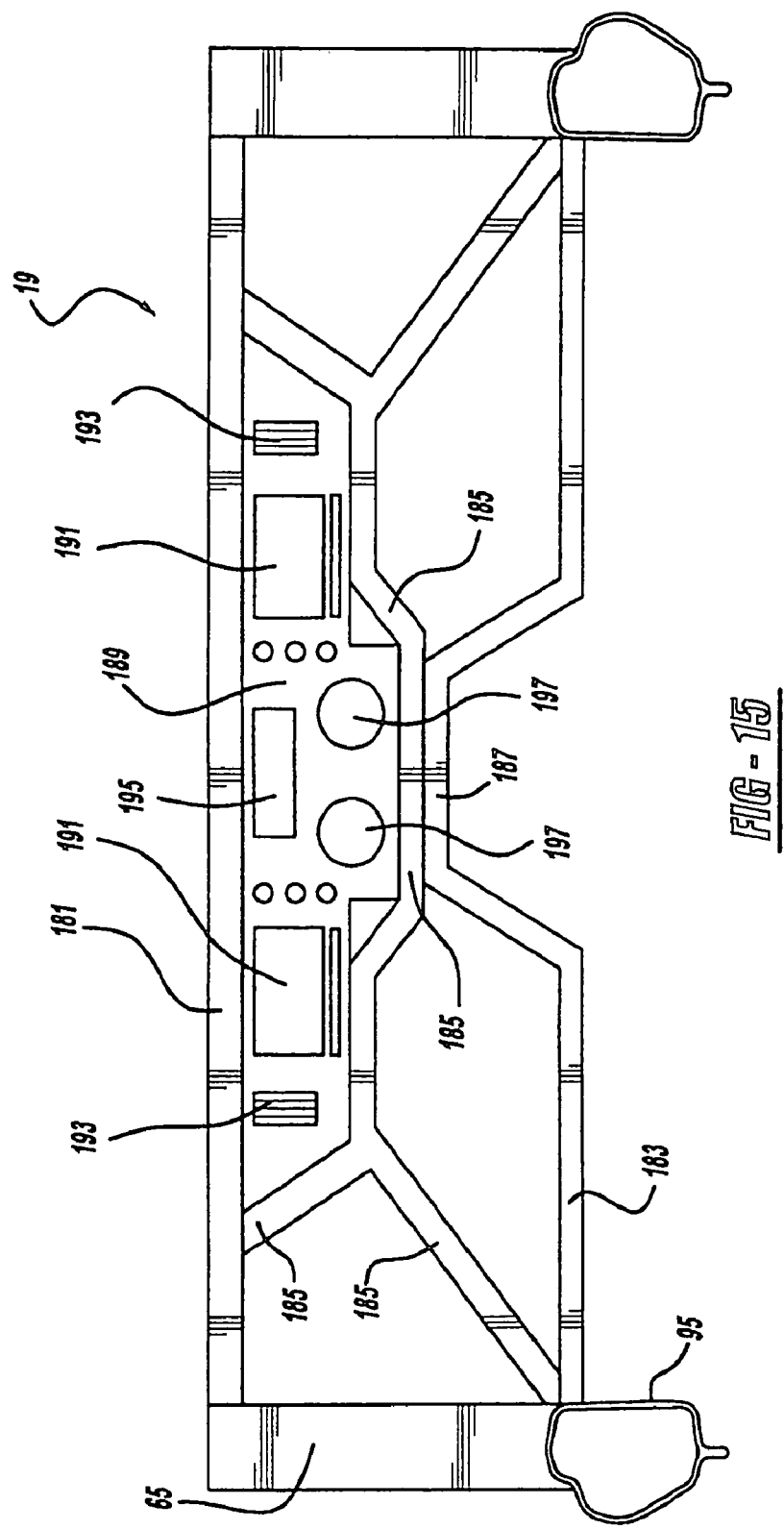
FIG. 15 is a diagrammatic rear view, as seen from line 4-4 of FIG. 1, showing a fifth preferred embodiment structural reinforcement system of the present invention.

A fifth preferred embodiment system 19 is shown in FIG. 15. In this embodiment, a generally straight and horizontal upper beam 181 is connected to a lower beam 183 by multiple branching, intermediate beams 185. Lower beam 183 has a raised central segment 187 to circumvent the floor tunnel. Beams 181 and 183 are attached to B-pillars 65 and rocker panels 95. A central, component cluster assembly 189 is mounted to system 19 within an aperture between the beams for use by the rear seat passengers. Component cluster assembly 189 includes audio and video entertainment systems 191, heating/ventilating/air conditioning ducts and controls 193, a storage compartment 195, communications devices 197, and the like.

Figure 16:
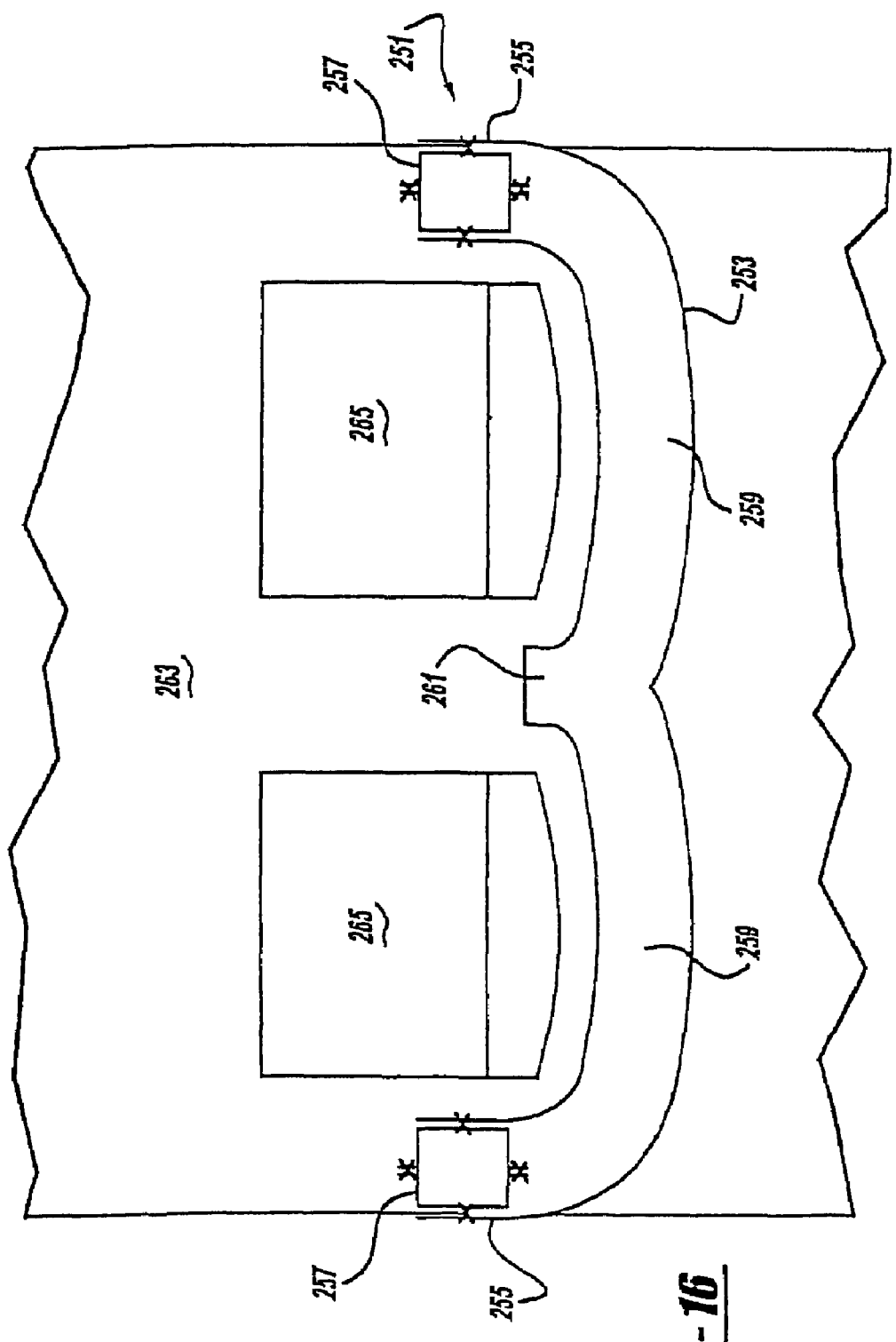
FIG. 16 is a diagrammatic top view showing a second alternate embodiment structural reinforcement system of the present invention.

Referring to FIG. 16, a second alternate embodiment of a structural reinforcement system 251 includes a structural beam 253 extending in a primarily cross-vehicle direction. Ends 255 of beam 253 are welded or otherwise fastened to B pillars 257. Beam 253 has a pair of arcuately curved segments 259 joining at a forwardly extending central segment 261 which can be optionally secured to a floor panel 263 or fore-and-aft extending tunnel attached thereto, by a generally vertical bracket or gusset. A front seat 265 is located forward of each curved segment 259 and each seat back may have a top view curve conforming with the adjacent curved shape of beam 253. A floor mounted, interior trim console (such as that shown in FIG. 14) may be provided between seats 265 and can either extend above center segment 261 for use by both front and rear seat passengers, may extend below central segment 261 such that the center portion of beam 253 creates an aesthetic styling element in the vehicle as well as providing a functional reinforcement, or a two-piece console may sandwich central segment 261 of beam 253. The rear view shape of beam 253 can extend straight across the vehicle or may have a central depression such as that shown in FIGS. 4 and 7.

Figure 17:
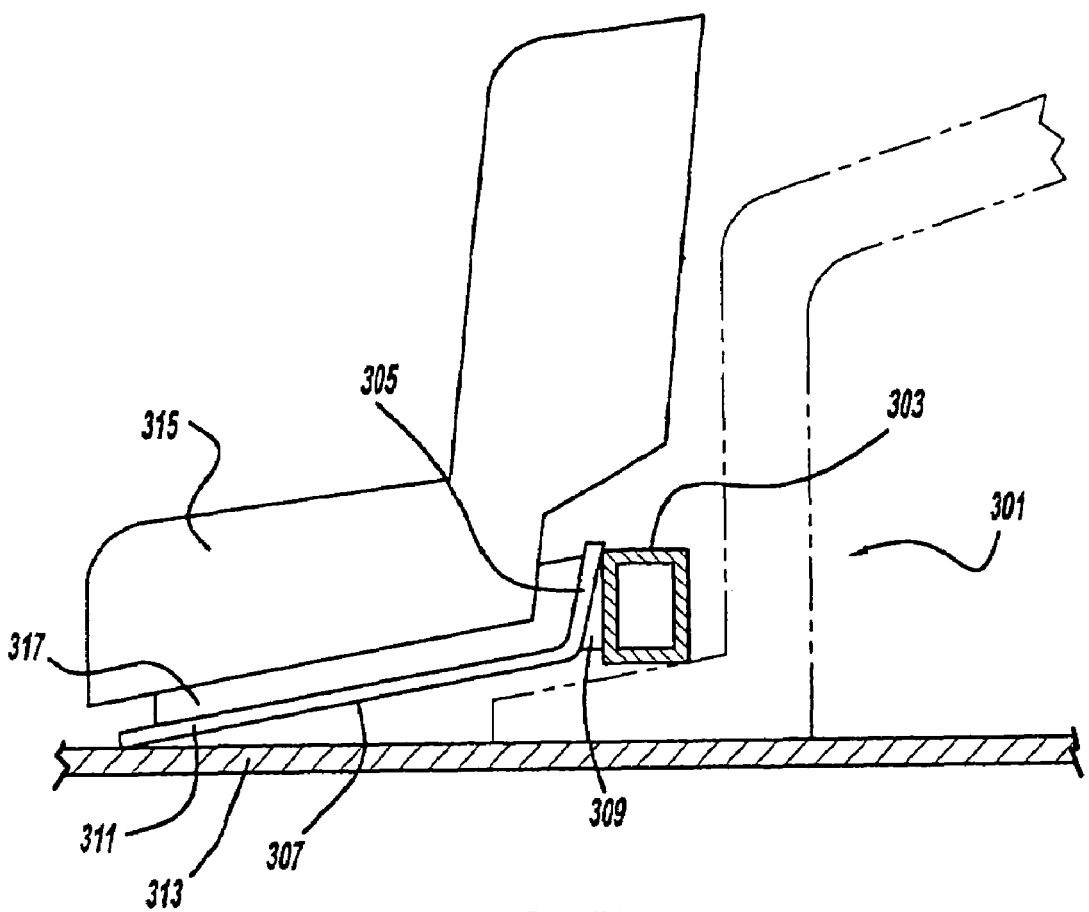
FIG. 17 is a diagrammatic side view showing a third alternate embodiment structural reinforcement system of the present invention.

FIG. 17 illustrates a third alternate embodiment structural reinforcement system 301 of the present invention. In this embodiment, a structural beam 303 extends in a generally straight (when viewed from the top and rear) orientation between the B-pillars or other upstanding structural members of the automotive vehicle adjacent the rocker panels. Beam 303 is an enclosed and hollow polygon, here shown with four sides when viewed in cross-section, which can be created from and extruded or hydroformed steel. Rear sections 305 of metal seat tracks 307 are attached to beam 303 by welded or riveted brackets 309. Front sections 311 of seat tracks 307 are attached to a metal floor panel 313 by welded, riveted or bolted on brackets. Front seats 315, or other passenger seats, and their respective seat movement mechanisms 317 are attached to seat tracks 307. Exemplary seat movement mechanisms 317 are disclosed in U.S. Pat. No. 5,575,531 entitled "Vehicle Power Seat Adjuster with End Driven Lead Screw Actuation" which issued to Gauger, et al. on Nov. 19, 1996, and is incorporated by reference herein. Space is provided below beam 303 and the adjacent portion of seat tracks 307 so as to maximize passenger compartment leg room and foot room. Beam 303 is secured to the vehicle well below a belt line area but may be useful in trucks, vans, sport utility vehicles and other situations that serve to add the required vibrational stiffness, minimize cross-vehicle and diagonal twisting of the vehicle body, while also improving crashworthiness during side impact. Thus, beam 303 advantageously serves as a multifunctional part.

While various aspects of the structural reinforcement system have been disclosed, it should be appreciated that variations may be made which fall within the scope of the present invention. For example, additional accessories can be attached to any of the structural reinforcement beams disclosed herein such as folding tables, lamps, telephones, computers and the like. Furthermore, the beams can alternately be manufactured from composite materials such as glass-filled polymers, metal inserts molded within polymers, and the like. The cross-vehicle beams and reinforcements can also be employed behind rear seats or in front of instrument panels although various advantageous of the present invention may not be fully achieved. Structural system 19 is preferably employed in a convertible vehicle having four, side passenger doors 213 but may also be used in a stretch limousine having four or more passenger doors and a stationary roof. Bulletproof armor is optionally mounted along a cross-car plane parallel and internal to trim panels 105. Furthermore, it should be appreciated that alternate beam shapes can be employed. It is intended by the following claims to cover these and any other departures from the disclosed embodiments that fall within the true spirit of the invention.

The invention claimed is:

1. An automotive vehicle comprising:
a first passenger seating area;
a front door located laterally adjacent the first seating area;
a second passenger seating area located rearwardly of the first seating area;
a second door located laterally adjacent the second seating area, the second door being located on the same side as and rearwardly of the first door; and
a structural reinforcement located between the first and second seating areas, the reinforcement being laterally elongated and having a lower structural beam and an upper structural beam;
a majority of the lower beam being located substantially adjacent a vehicle floor area; and
the upper structural beam being located substantially adjacent a vehicular belt-line area;
wherein the lower beam of the structural reinforcement is raised adjacent the fore-and-aft extending centerline of the vehicle.

2. The automotive vehicle of claim 1 wherein the structural reinforcement further comprises a first diagonal beam extending between the upper and lower beams.

3. The automotive vehicle of claim 1 further comprising an entertainment system attached to the structural reinforcement.

4. The automotive vehicle of claim 1 further comprising a rear passenger safety restraint is attached to the structural reinforcement.

5. The automotive vehicle of claim 4 wherein the rear passenger safety restraint is an inflatable airbag.

6. The automotive vehicle of claim 1 further comprising at least one roll bar attached to the structural reinforcement.

7. The automotive vehicle of claim 1 further comprising armor attached to the structural reinforcement.

8. The automotive vehicle of claim 1 wherein the structural reinforcement assists the vehicle in satisfactorily passing Federal Motor Vehicle Safety Standard side impact test 214.

9. The automotive vehicle of claim 1 further comprising at least two front seats located in the front seating area, the front seats being independently movable and not restrained by the structural reinforcement.

10. The automotive vehicle of claim 1 further comprising a convertible roof movable to a raised position, covering the front and rear seating areas, to a retracted position.

11. The automotive vehicle of claim 1 wherein the structural reinforcement is hydroformed metal.

12. An automotive vehicle comprising:
a first passenger seating area;
a front door located laterally adjacent the first seating area;
a second passenger seating area located rearwardly of the first seating area;
a second door located laterally adjacent the second seating area, the second door being located on the same side as and rearwardly of the first door; and
a structural reinforcement located between the first and second seating areas, the reinforcement being laterally elongated and having a lower structural beam and an upper structural beam;
a majority of the lower beam being located substantially adjacent a vehicle floor area; and
wherein the structural reinforcement further comprises a first diagonal beam extending between the upper and lower beams; and
wherein the structural reinforcement further comprises a second diagonal beam crossing the first diagonal beam and extending between the upper and lower beams.

13. The automotive vehicle of claim 12 further comprising an electronic device attached to the structural reinforcement.

14. The automotive vehicle of claim 12 further comprising at least two front seats located in the front seating area, the front seats being independently movable and not restrained by the structural reinforcement.

15. The automotive vehicle of claim 12 further comprising a convertible roof movable from a raised position to retracted position.

16. An automotive vehicle comprising:
a first passenger seating area;
a front door located laterally adjacent the first seating area;
a second passenger seating area located rearwardly of the first seating area;
a second door located laterally adjacent the second seating area, the second door being located on the same side as and rearwardly of the first door; and a structural reinforcement located between the first and second seating areas, the reinforcement being laterally elongated and having a lower structural beam and an upper structural beam;

a majority of the lower beam being located substantially adjacent a vehicle floor area; and wherein the upper beam of the structural reinforcement is lower in height adjacent a fore-and-aft extending centerline of the vehicle.

17. The automotive vehicle of claim 16 wherein the lower beam of the structural reinforcement is raised adjacent the fore-and-aft extending centerline of the vehicle, and the vehicle is of a unibody construction.

18. The automotive vehicle of claim 16 further comprising at least two front seats located in the front seating area, the front seats being independently movable and not restrained by the structural reinforcement.

19. The automotive vehicle of claim 16 further comprising a convertible roof movable from a raised position to retracted position.

20. An automotive vehicle comprising:
   a front passenger seat;
   a rear passenger seat located substantially behind the front seat;
   a left structural rocker panel;
   a right structural rocker panel; and
   a structure extending in a substantially cross-vehicle direction between the front and rear seats, a first portion of the structure being adjacent at least a vehicular beltline, a second portion of the structure being coupled to the rocker panels, the structure including at least two crossing diagonal beams;
   the front seat being movable in a fore-and-aft direction independent of the structure.

21. The automotive vehicle of claim 20 wherein the first portion of the structure comprises an upper structural beam and the second portion of the structure comprises a lower structural beam.

22. The automotive vehicle of claim 21 wherein a first of the diagonal beams extends between the upper and lower beams.

23. The automotive vehicle of claim 20 further comprising at least four passenger doors, at least two in front of the structural device and at least two behind the structure.

24. The automotive vehicle of claim 23 further comprising left and right B-pillars extending substantially vertically above the rocker panels, the structure being directly attached to the B-pillars, the rocker panels and B-pillars being of unibody construction.

25. The automotive vehicle of claim 20 further comprising an electronic device attached to the structure.

26. The automotive vehicle of claim 20 further comprising a rear passenger safety restraint attached to the structure.

27. The automotive vehicle of claim 20 wherein the structure is hydroformed metal.

28. The automotive vehicle of claim 20 further comprising armor attached to the structure.

29. The automotive vehicle of claim 20 further comprising a convertible roof automatically movable to a raised position, covering the front and rear seats, to a retracted position.

30. An automotive vehicle comprising:
   a front passenger seat;
   a rear passenger seat located substantially behind the front seat;
   a left structural rocker panel;
   a right structural rocker panel; and
   a structure extending in a substantially cross-vehicle direction between the front and rear seats, a first portion of the structure being adjacent at least a vehicular beltline, a second portion of the structure being coupled to the rocker panels;
   the front seat being movable in a fore-and-aft direction independent of the structure;
   wherein the first portion of the structure device is an upper structural beam which is lower in height adjacent a fore-and-aft extending centerline of the vehicle.

31. The automotive vehicle of claim 30 further comprising a convertible roof movable from a raised position to retracted position.

32. An automotive vehicle comprising:
   a body having a front seating area and a rear seating area;
   at least one front passenger door opening positioned to allow access to the front seating area;
   at least one rear passenger door opening positioned to allow access to the rear seating area;
   a convertible roof movable from a raised position, covering at least one of the seating areas, to a retracted position;
   a structural reinforcement extending in a substantially cross-vehicle direction between the seating areas, the structural reinforcement including a substantially hollow upper beam extending in a cross-vehicle direction substantially adjacent a beltline of the body; and
   at least two front seats located in the front seating area, the front seats being independently movable and not attached to the structural reinforcement.

33. The automotive vehicle of claim 32 further comprising an entertainment system attached to the structural reinforcement.

34. The automotive vehicle of claim 33 wherein the entertainment system includes a rear passenger audio transmitting device.

35. The automotive vehicle of claim 32 further comprising a rear passenger safety restraint attached to the structural reinforcement.

36. The automotive vehicle of claim 35 wherein the rear passenger safety restraint is an inflatable airbag.

37. The automotive vehicle of claim 32 wherein the structural reinforcement further comprises:
   a lower structure beam; and
   at least two crossing and diagonal, structural beams;
   wherein the lower and diagonal beams are all substantially hollow.

38. The automotive vehicle of claim 32 wherein the upper beam of the structural reinforcement is lower in height adjacent a fore-and-aft extending centerline of the vehicle.

39. The automotive vehicle of claim 32 further comprising at least one roll bar attached to the structural reinforcement.

40. The automotive vehicle of claim 32 further comprising at least two front seats located in the front seating area, the front seats being independently movable and not attached to the structural reinforcement.

41. The automotive vehicle of claim 32 wherein the convertible roof further comprises:
   an automatic actuator;
   roof rails and roof bows operably movable by the actuator; and
   a pliable roof cover attached to the roof bows.

42. The automotive vehicle of claim 32 wherein the convertible roof further comprises:
   an automatic actuator; and
   at least one hard-top roof panel operably movable by the actuator.

43. An automotive vehicle comprising:
a body having a front seating area and a rear seating area;
at least one front passenger door opening positioned to allow access to the front seating area;
at least one rear passenger door opening positioned to allow access to the rear seating area;
a convertible roof movable from a raised position, covering at least one of the seating areas, to a retracted position;
a structural reinforcement extending in a substantially cross-vehicle direction between the seating areas, the structural reinforcement including a substantially hollow upper beam extending in a cross-vehicle direction substantially adjacent a beltline of the body; and
a structural rocker panel attached to the structural reinforcement.

44. An automotive vehicle comprising:
a body having a front seating area and a rear seating area;
at least one front passenger door opening positioned to allow access to the front seating area;
at least one rear passenger door opening positioned to allow access to the rear seating area;
a convertible roof movable from a raised position, covering at least one of the seating areas, to a retracted position;
a structural reinforcement extending in a substantially cross-vehicle direction between the seating areas, the structural reinforcement including a substantially hollow upper beam extending in a cross-vehicle direction substantially adjacent a beltline of the body; and
a central floor tunnel attached to the structural reinforcement.

45. An automotive vehicle comprising:
a body having a front seating area and a rear seating area, the body also having a floor;
at least one front passenger door opening positioned to allow access to the front seating area;
at least one rear passenger door opening positioned to allow access to the rear seating area;
a convertible roof movable from a raised position, covering at least one of the seating areas, to a retracted position; and
a structural reinforcement extending in a substantially cross-vehicle direction between the seating areas, the structural reinforcement including a first beam having a majority portion extending in a cross-vehicle direction spaced away from the floor;
wherein the structural reinforcement further comprises a second beam upwardly extending in a diagonal manner from the first beam adjacent a substantially vertically extending B-pillar.

46. The automotive vehicle of claim 45 wherein the structural reinforcement further comprises:
a lower structure beam located adjacent the floor; and
at least two crossing and diagonal, structural beams;
wherein the lower and diagonal beams are all substantially hollow.

47. The automotive vehicle of claim 45 wherein the first beam of the structural reinforcement is lower in height adjacent a fore-and-aft extending centerline of the vehicle.

48. The automotive vehicle of claim 45 further comprising at least one roll bar attached to the structural reinforcement.

49. The automotive vehicle of claim 45 further comprising at least two front seats located in the front seating area, the front seats being independently movable and not attached to the structural reinforcement.

50. The automotive vehicle of claim 45 wherein the convertible roof further comprises:
an automatic actuator;
roof rails and roof bows operably movable by the actuator; and
a pliable roof cover attached to the roof bows.

51. The automotive vehicle of claim 45 wherein the convertible roof further comprises:
an automatic actuator; and
at least one hard-top roof panel operably movable by the actuator.

52. The automotive vehicle of claim 45 wherein the first beam is an upper beam attached to B-pillars of the body substantially adjacent a beltline of the body.

53. The automotive vehicle of claim 45 wherein the structural reinforcement further comprises a lower beam extending in a substantially cross-vehicle direction and a first diagonal beam extending between the first and lower beams.

54. The automotive vehicle of claim 45 wherein the structural reinforcement assists the vehicle in satisfactorily passing Federal Motor Vehicle Safety Standard side impact test 214.

55. An automotive vehicle comprising:
a body having a front seating area and a rear seating area, the body also having a floor;
at least one front passenger door opening positioned to allow access to the front seating area;
at least one rear passenger door opening positioned to allow access to the rear seating area;
a convertible roof movable from a raised position, covering at least one of the seating areas, to a retracted position;
a structural reinforcement extending in a substantially cross-vehicle direction between the seating areas, the structural reinforcement including a beam having a majority portion extending in a cross-vehicle direction spaced away from the floor; and
a rear passenger safety restraint attached to the structural reinforcement;
wherein the structural reinforcement further comprises a second beam upwardly extending in a diagonal manner from the beam adjacent a substantially vertically extending B-pillar.

56. The automotive vehicle of claim 55 wherein the structural reinforcement assists the vehicle in satisfactorily passing Federal Motor Vehicle Safety Standard side impact test 214.

57. A method of manufacturing a portion of an automotive vehicle including two front passenger door openings, at least two rear passenger door openings, substantially vertical pillars each located between the front and rear door openings, a vehicle floor, an internal structure, and front passenger seats, the method comprising:
(a) creating the internal structure from a rigid material to comprise at least two elongated and generally parallel members;
(b) securing the internal structure to the pillars with a majority of each of the members extending in a generally cross-vehicle direction from at least a center of the vehicle to at least one of the pillars, substantially below a vehicle beltline and above the vehicle floor;
(c) allowing the front passenger seats to move independently of the internal structure; and
(d) mounting a convertible roof to the automotive vehicle.

58. The method of claim 57 further comprising:
(a) spacing one of the members above the other; and
(b) affixing diagonal beams between the members.

59. The method of claim 57 further comprising creating the members with a closed wall cross-sectional shape defining a substantially hollow center.

60. The method of claim 57 further comprising automatically opening and closing the convertible roof.

61. The method of claim 57 further comprising spacing at least one of the members away from a floor of the vehicle.

62. The method of claim 57 further comprising using the structure to assist in passing Federal Motor Vehicle Safety Standard side impact test 214.

63. The method of claim 57 further comprising creating a diagonally extending beam upwardly extending from at least one of the members.

* * * * *